UNITED STATES PATENT OFFICE.

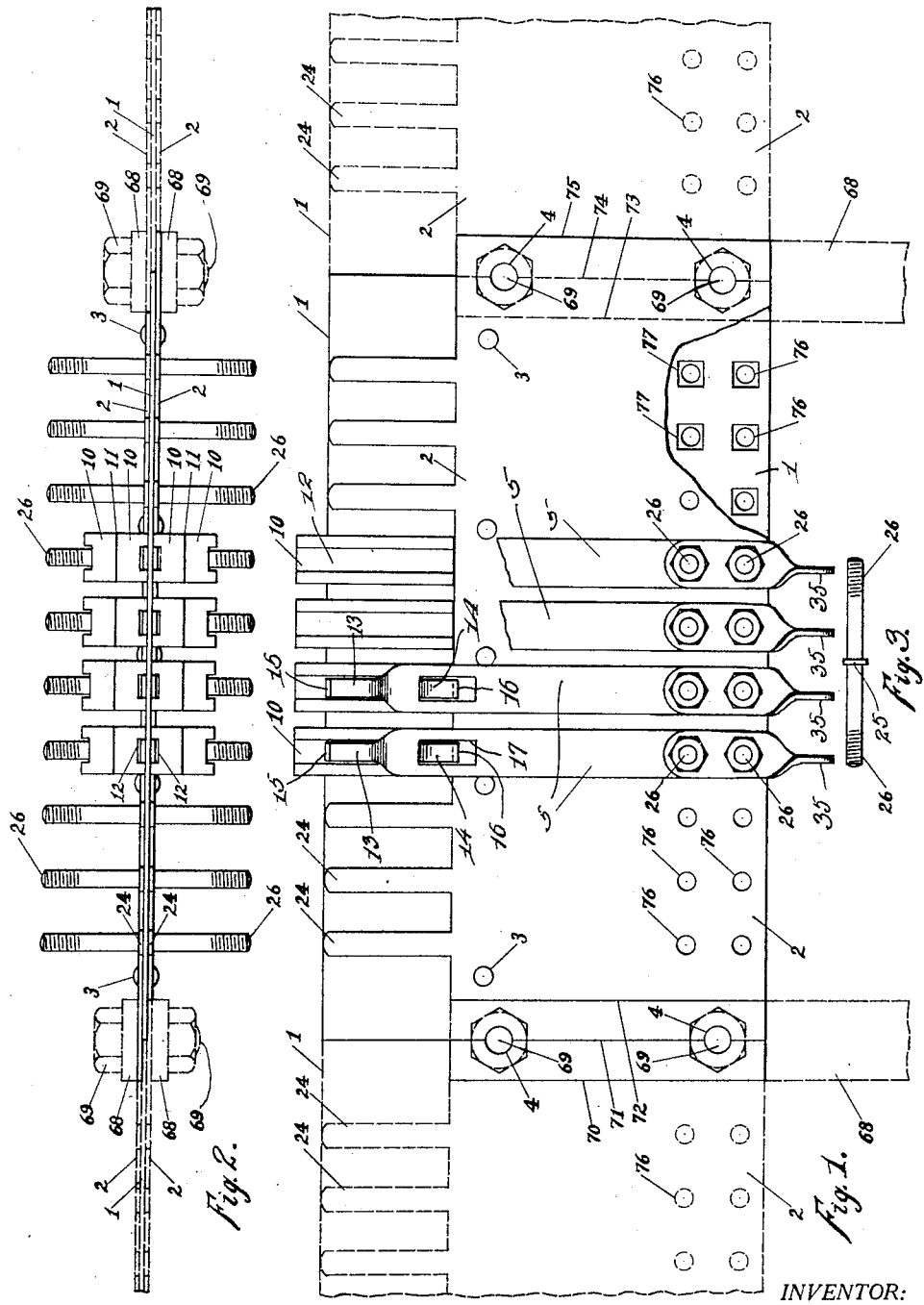

FREDERICK R. PARKER, OF CHICAGO, ILLINOIS.

MOUNTING PLATE FOR ELECTRICAL PROTECTIVE APPARATUS.

1,405,935. Specification of Letters Patent. Patented Feb. 7, 1922.

Application filed June 1, 1915, Serial No. 31,487. Renewed June 17, 1921. Serial No. 478,457.

*To all whom it may concern:*

Be it known that I, FREDERICK R. PARKER, a citizen of the United States of America, residing at Chicago, in the county of Cook and State of Illinois, have invented a new and useful Mounting Plate for Electrical Protective Apparatus, of which the following is a specification, reference being had to the accompanying drawings, illustrating same.

My invention relates to mounting plates or ground plates for electrical protective apparatus, the particular construction of the mounting plate or ground plate illustrated in the accompanying drawings being especially adapted for what is known as telephone switchboard protectors, although the invention may be used in connection with various protectors or for other purposes.

The objects of my invention are, to provide an improved mounting plate or ground plate of the character herein set forth, having the features herein disclosed; to provide improved mounting bolts or mounting members in connection with the mounting plate or ground plate for mounting apparatus onto opposite sides thereof, and improved means for retaining such mounting bolts or mounting members in their proper association with the mounting plate or ground plate; to provide improved means for connecting the sections of the mounting plate or ground plate together to form a continuous plate or strip of any length; to provide improved means for mounting the mounting plate or ground plate, or the sections thereof, to a suitable support, such as a cross-connecting rack or other support; to provide an improved construction of the mounting plate or ground plate of the invention for accommodating protective devices; and to provide other improved constructions in the device of the invention, as herein disclosed.

Still other objects will be apparent from the following specification.

In the accompanying drawings illustrating the preferred form of my invention, Figure 1 is a side elevation of the mounting plate or ground plate of the invention, with protective devices mounted thereon and a portion of one of the outer plates removed to show the construction of the middle plate, this figure also showing how the different sections of the mounting plate or ground plate are attached together to provide a continuous plate or strip, and how the mounting plate as a whole or the various sections thereof may be mounted to a cross-connecting rack or other suitable support; Fig. 2 is an edge elevation of the mounting plate or ground plate of Fig. 1, showing how the high-potential electricity arresters are arranged on opposite sides thereof and the mounting bolts by means of which the protective apparatus is mounted onto opposite sides of the mounting plate, and also showing how the different sections of the mounting plate or ground plate are attached together to provide a continuous plate or strip, and how the mounting plate as a whole or the various sections thereof may be mounted to a cross-connecting rack or other suitable support; and Fig. 3 is a side elevation of the preferred form of mounting bolt carried by the mounting plate and utilized for mounting the protective apparatus onto opposite sides of the mounting plate.

Like characters refer to like parts in the several figures.

The preferred embodiment of my invention, as illustrated in the accompanying drawings, will now be described in detail as follows:

Each section of the mounting plate or ground plate comprises three, thin, substantially flat, metal plates 2 1 2 placed together broadsidedly and out of complete register with each other longitudinally so that the ends of the three plates extend to the lines 70, 71, 72, 73, 74 and 75. This arrangement of the plates 2 1 2 of a section of the mounting plate permits a series of the sections to be placed together endwise as shown, so that the end portions of the plates of adjacent sections overlap each other as shown, the sections of the mounting plate being held together by metal strips 68 68 on opposite sides of the mounting plate at the ends of the said sections, and by bolts 69 69 extending through the strips 68 68 and through the ends of the sections of the mounting plate to clamp the whole together. This arrangement of the sections of the mounting plate provides a continuous mounting plate of any desired length having a neat appearance and a very substantial construction. The holes 4 4 for the bolts 69 69 are recesses in the abutting ends of the middle plates 1 1 of the mounting plate, and full holes through the overlapping end portions of the outer plates 2 2. Each section of the mounting plate is generally made of a length to accommodate either ten or twenty pairs of protective devices, the section shown in Figs. 1 and 2 being a ten-pair section. The sections shown in dotted lines are shown connected to the ends of the ten-pair section. The ends of the strips 68 68 which project from the rear of the mounting plate may be connected to a cross-connecting rack or other suitable support to mount the mounting plate and protective apparatus as a whole thereto. The double-ended bolts 26 26 extend through the mounting plate as shown and are used for mounting the protective apparatus onto opposite sides of the mounting plate or ground plate. The plates 2 1 2 of the sections of the mounting plate are preferably held together by rivets 3 3 and by the apparatus mounted on bolts 26 26. The plates 2 1 2 are preferably punched out of sheet steel and are copper plated and then nickel plated to keep them bright and from rusting. The holes in the plates 2 1 2 are also preferably punched. The plates 2 2 are preferably identical. Each of the bolts 26 26 has a shoulder portion or projecting portion 25 thereon at the middle thereof, which portion 25 is preferably square but may be made in other forms. The middle plate 1 of the mounting plate is provided with holes 77 77 therethrough, preferably square but which may be made any shape and size to accommodate and fit the projecting portions 25 25 on the bolts 26 26. The outer plates 2 2 of the mounting plate are provided with holes 76 76 therethrough to accommodate the end portions of the bolts 26 26. When the plates 2 1 2 are assembled as shown, the portions 25 25 of the bolts 26 26 are located within the holes 77 77 in the plate 1. The square portions 25 25 on the bolts 26 26, fitting in the square holes 77 77 in the plate 1, hold the bolts 26 26 from turning, and the plates 2 2 bearing against the projecting portions 25 25 on the bolts 26 26 hold the bolts 26 26 from moving endwise in either direction. This permits the sets of apparatus on opposite sides of the mounting plate to be mounted onto opposite ends of the bolts 26 26 separately. The portions 25 25 on the bolts 26 26 are preferably slightly thicker than the middle plate 1, so that the plates 2 2 will bear tightly against the portions 25 25 on the bolts 26 26 and thereby make good electrical connection between the bolts 26 26 and the mounting plate or ground plate 2 1 2. The outer plates 2 2 of the mounting plate are provided with tongue portions 24 24 along the front edge of the mounting plate, over which tongue portions the inner electrodes 10 10 of high-potential electricity arresters 10 11 10 10 11 10 are placed as shown, the grooves 12 12 in the electrodes 10 10 accommodating the tongue portions 24 24 so that the electrodes 10 10 preferably rest against the middle plate 1 on opposite sides thereof. The tongue portions 24 24 prevent lateral displacement of the inner electrodes 10 10 of the high-potential electricity arresters. The edge portions of the plates 2 2 between the tongue portions 24 24 may form stops to limit the insertion of the inner electrodes 10 10 of the high-potential electricity arresters into the apparatus.

Each high-potential electricity arrester 10 11 10 preferably comprises carbon or other suitable electrodes 10 10 and an interposed dielectric member 11 of celluloid or other suitable insulating material provided with a number of small holes therethrough to permit the discharge of electricity thereacross from the outer electrode 10 to the inner electrode 10 to take place through air.

Each high-potential electricity arrester 10 11 10 is inserted between the free end of a spring member 5 and the ground plate 2 1 2 which is connected to earth, the tongue portions 13 and 14 of the spring member 5 resting against the outer electrode 10 of the arrester, due to the tension in spring 5, within a groove 12 in the outer electrode, so as to hold the arrester 10 11 10 firmly against the ground plate 2 1 2 and at the same time prevent lateral displacement of the outer electrode 10. The end 15 of spring 5 is turned outwardly preferably as shown, so as to provide a rounded corner portion over which the arrester 10 11 10 may be slid when it is inserted into the apparatus. The end 16 of the portion 14 of the spring member 5 is bent inwardly or toward the ground plate to form a stop for limiting the insertion of the outer electrode 10 into the apparatus. The construction of the portions 13 14 and 16 of the spring member 5 is described and claimed in my United States Letters Patent No. 1,179,380, dated April 11, 1916, on high-potential electricity arrester.

The spring members 5 5 are mounted onto the mounting bolts 26 26 preferably as shown, onto both sides of the mounting plate 2 1 2, the springs 5 5 being insulated from the bolts 26 26 and from the mounting plate 2 1 2 in any suitable manner. Each two arresters 10 11 10 10 11 10 directly opposite each other on opposite sides of the ground plate 2 1 2 preferably constitute a pair. The springs 5 5 are provided with line terminals 35 35 to which line conductors may be connected. High-potential electricity passes from the line, through spring 5, the arrester 10 11 10, and the ground plate 2 1 2, to ground, in the usual manner.

I may, of course, mount various forms of protective apparatus, or other apparatus, onto the mounting bolts 26 26 on both sides of the mounting plate 2 1 2, in the manner now well understood. My improved mounting bolts enable me to mount such apparatus onto opposite ends of the bolts separately without having to hold the bolts from turning.

I desire it to be understood that the various features of this invention may in some instances be used singly and in other instances collectively, without departing from the scope of the appended claims, and that all such usages are contemplated herein.

I also desire it to be understood that I do not wish to limit this invention nor the various parts thereof to the exact details of construction herein set forth, as various modifications thereof may be made or utilized without departing from the scope of the appended claims.

What I claim herein is:

1. A mounting plate for electrical protective apparatus, comprising three metal plates placed together broadsidedly, and bolts extending through all of the plates along one edge of the mounting plate for mounting parts of the apparatus onto opposite sides of the mounting plate, each outer plate having a row of tongue portions formed thereon along the opposite edge of the mounting plate for preventing lateral displacement of protective devices, the middle plate extending along between the rows of tongue portions of the outer plates.

2. A mounting plate of the character set forth comprising three metal plates assembled broadsidedly, and bolts extending through all of the plates for mounting parts of apparatus onto the mounting plate, each outer plate having portions for preventing lateral displacement of parts carried by the mounting plate, the middle plate extending between the said portions of the respective outer plates.

3. A mounting plate for electrical protective apparatus, comprising three sheet-metal plates assembled broadsidedly, and double-ended mounting bolts extending through all of the plates for mounting parts of the apparatus onto opposite sides of the mounting plate, the said sheet-metal plates and body portions of the bolts having co-operating means whereby the said bolts are held against turning and against longitudinal movement in either direction.

4. A mounting plate for sets of electrical protective apparatus, comprising three flat metal plates placed together broadsidedly, the three plates having a plurality of registering holes therethrough along one edge thereof, the holes in the outer plates being round, the holes in the middle plate being square and having their sides longer than the diameters of the holes in the outer plates, and double-ended bolts extending through the holes in all of the plates for mounting parts of the apparatus onto opposite sides of the mounting plate, the said bolts having medially-disposed enlarged square portions thereon carried within the said square holes in the middle plate whereby when the plates are held together the bolts are held against turning and also against longitudinal movement to permit the sets of the said apparatus to be mounted onto or dismounted from opposite ends of the bolts separately.

5. A mounting plate for sets of electrical protective apparatus, comprising three plates placed together broadsidedly, the three plates having a plurality of registering holes therethrough along one edge thereof, the holes in the outer plates being round, the holes in the middle plate being square, and double-ended bolts extending through the holes in all of the plates for mounting parts of the apparatus onto opposite sides of the mounting plate, the said bolts having medially-disposed square portions thereon carried within the said square holes in the middle plate whereby when the plates are held together the bolts are held against turning and also against longitudinal movement to permit the sets of the said apparatus to be mounted onto or dismounted from opposite ends of the bolts separately.

6. A mounting plate of the character set forth comprising three plates assembled broadsidedly, the three plates having a plurality of registering holes therethrough, the holes in the middle plate being larger than the holes in the outer plates, and double-ended mounting bolts extending through the holes in all of the plates, the said bolts having medially-disposed enlarged portions thereon carried within the said holes in the middle plate whereby when the plates are held from separating the bolts are held against movement.

7. A mounting plate of the character set forth comprising three plates assembled broadsidedly and having a plurality of registering holes therethrough, the holes in the middle plate being larger in a certain respect than the holes in the outer plates, and bolts extending through the holes in the plates, the said bolts having protruding portions thereon carried within the holes in the middle plate whereby when the plates are held from separating the bolts are held against movement.

8. A mounting plate of the character set forth comprising three plates assembled broadsidedly, one of the outer plates and the middle plate having registering holes therethrough, the holes in the middle plate being larger in a certain respect than the said holes in the outer plate, and bolts extending through the said holes in the outer plate and having protruding portions thereon carried within the holes in the middle plate whereby when the plates are held from separating the bolts are held against movement.

9. A mounting plate comprising three plates placed side by side, each of the outer plates having a round hole therethrough, the middle plate having a square hole therethrough larger than the said holes in the outer plates, and a mounting bolt extending through the holes in all of the plates, the said bolt having a medially-disposed square portion thereon carried within the square hole in the middle plate whereby when the plates are held from separating the bolt is held against turning and also against longitudinal movement.

10. A mounting plate comprising three plates placed side by side, each of the outer plates having a hole therethrough, the middle plate having a hole therethrough larger in a certain respect than the said holes in the outer plates, and a mounting bolt extending through the holes in all of the plates, the said bolt having a protruding portion thereon carried within the hole in the middle plate whereby when the plates are held from separating the bolt is held against movement.

11. A mounting plate comprising three plates placed side by side, each of the outer plates having a hole therethrough, the middle plate having a hole therethrough larger in a certain respect than the said holes in the outer plates, and a mounting member extending through the holes in all of the plates, the said mounting member having a protruding portion thereon accommodated by the hole in the middle plate whereby when the plates are held from separating the said mounting member is held against movement.

12. A mounting plate comprising three plates placed side by side, one of the outer plates having a hole therethrough, the middle plate having a hole therethrough larger in a certain respect than the said hole in the outer plate, and a mounting member extending through the said hole in the outer plate and having a protruding portion thereon accommodated by the hole in the middle plate whereby when the plates are held from separating the said mounting member is held against movement.

13. A mounting plate for electrical protective apparatus, comprising three sheet-metal plates placed side by side, and double-ended mounting bolts extending through the three plates, the said plates and body portions of the bolts having co-operating means whereby the middle plate holds the said bolts against turning and the side plates hold the said bolts against longitudinal movement in either direction.

14. A mounting plate for electrical protective apparatus, comprising a plurality of sheet-metal plates placed side by side, and double-ended mounting bolts extending through the said plates, the said plates and body portions of the bolts having co-operating means whereby one of the plates holds the said bolts against turning and another of the plates holds the said bolts against longitudinal movement.

15. A mounting plate of the character set forth comprising three plates placed side by side, and mounting bolts co-operating with the said plates, the said plates and body portions of the bolts having co-operating means whereby the middle plate holds the said bolts against turning and the side plates hold the said bolts against longitudinal movement in either direction.

16. A mounting plate of the character set forth comprising a plurality of plates placed side by side, and mounting bolts co-operating with the said plates, the said plates and body portions of the bolts having co-operating means whereby one of the plates holds the said bolts against turning and another of the plates holds the said bolts against longitudinal movement.

17. The combination of a mounting plate for sets of electrical protective apparatus, comprising a plurality of sheet-metal plates placed side by side, and mounting bolts near one edge of the mounting plate for mounting parts of the apparatus onto opposite sides of the mounting plate, the said sheet-metal plates having means co-operating with the mounting bolts whereby the sets of protective apparatus may be mounted upon the said mounting bolts onto opposite sides of the mounting plate separately.

18. The combination of a mounting plate for protective devices, comprising three metal plates placed side by side, the two outer plates being provided with projecting portions thereon along one edge of the mounting plate, and protective devices on respective sides of the mounting plate bearing against the middle plate and straddling the said projecting portions which hold the said protective devices against lateral displacement.

19. The combination of a mounting plate for protective devices, comprising three plates placed side by side, the outer plates being provided with projections thereon, and protective devices on respective sides of the mounting plate straddling the said projections on the respective outer plates which projections hold the said devices against lateral displacement.

20. The combination of a mounting plate for protective devices, having projecting portions thereon on opposite sides thereof, and protective devices on respective sides of the mounting plate straddling the said projections on respective sides of the mounting plate, which projections hold the said devices against lateral displacement.

21. A mounting plate of the character set forth comprising a plurality of plates placed side by side, and double-ended mounting members extending through the said plates, each mounting member having a projecting portion thereon co-operating with the said plates whereby the said mounting members are held against turning and against longtiudinal movement in either direction.

22. A mounting plate of the character set forth comprising a plurality of plates placed side by side, and mounting members carried by the mounting plate, each mounting member having a projecting portion thereon co-operating with the said plates whereby the said mounting members are held against turning and against longitudinal movement.

23. A mounting plate for electrical protective apparatus, comprising a plurality of sections arranged end to end, each section comprising three substantially rectangular plates assembled broadsidedly so that portions of the corresponding ends of the plates project one past another, the projecting portions of the adjacent ends of the adjacent sections overlapping each other to provide a continuous plate, means for securing the overlapping end portions of the adjacent sections together, and means at the ends of the sections for mounting the mounting plate as a whole to a suitable support.

24. A mounting plate for electrical protective apparatus, comprising a plurality of sections arranged end to end, each section comprising three substantially rectangular plates assembled broadsidedly so that an end portion of at least one of the plates projects past an end portion of another of the plates, the projecting portions of the adjacent ends of the adjacent sections overlapping each other to provide a continuous plate, means for securing the overlapping end portions of the adjacent sections together, and means at the ends of the sections for mounting the mounting plate as a whole to a suitable support.

25. A ground-plate section for electrical protective apparatus, comprising three substantially rectangular sheet-metal plates of substantially the same length assembled broadsidedly out of complete register with each other longitudinally whereby portions of the corresponding ends of the plates project one past another, at each end of the section, and means for connecting the ends of the section with overlapping ends of other similar sections to provide a continuous ground plate.

26. A ground-plate section for electrical protective apparatus, comprising three sheet-metal plates assembled broadsidedly so that an end portion of at least one of the plates projects past an end portion of another of the plates, and means for connecting this end of the section with an overlapping end of another section to provide a continuous ground plate.

27. A mounting-plate section for electrical protective apparatus, comprising three substantially rectangular plates assembled broadsidedly so that portions of the corresponding ends of the plates project one past another, at each end of the section, and means at the ends of the section for mounting same to a suitable support.

28. The combination of a mounting plate for sets of electrical protective apparatus, comprising a plurality of sheet-metal plates placed side by side, and mounting bolts projecting outwardly from the mounting plate, on each side thereof, for mounting parts of the apparatus onto opposite sides of the mounting plate, the outer ends of the said bolts, on each side of the mounting plate, being threaded and provided with nuts, the said sheet-metal plates and bolts having co-operating means whereby the sets of the protective apparatus may be mounted upon the said mounting bolts onto opposite sides of the mounting plate separately.

29. The combination of a mounting plate for electrical protective apparatus, comprising a plurality of sheet-metal plates placed side by side, and mounting bolts projecting outwardly from the mounting plate, on each side thereof, for mounting parts of the apparatus onto opposite sides of the mounting plate, the outer ends of the said bolts, on each side of the mounting plate, being threaded, the said sheet-metal plates and bolts having co-operating means whereby the said bolts are held against turning and against longitudinal movement.

30. The combination of a mounting plate for sets of electrical protective apparatus, comprising a plurality of sheet-metal plates placed side by side, and mounting bolts for mounting parts of the apparatus onto opposite sides of the mounting plate, the said sheet-metal plates and bolts having co-operating means whereby each one of two opposite sets of the protective apparatus may be mounted upon one or more of the said mounting bolts onto the said mounting plate, and also dismounted from the said mounting plate, independently of the other.

As inventor of the foregoing I hereunto subscribe my name this 26th day of May, 1915.

FREDERICK R. PARKER.

Witnesses:
RAYMOND WICKHAM,
THEODORE E. KIRCHEL.